United States Patent Office 3,652,481
Patented Mar. 28, 1972

3,652,481
STABLE AQUEOUS EMULSIONS OF GRAFT
COPOLYMERS
Eugene S. Barabas, Watchung, and Frederick Grosser, Midland Park, N.J., assignors to GAF Corporation, New York, N.Y.
No Drawing. Filed Jan. 29, 1970, Ser. No. 6,956
Int. Cl. C08f 19/00, 41/00
U.S. Cl. 260—29.6 WB          10 Claims

ABSTRACT OF THE DISCLOSURE

Stable aqueous emulsions comprising a graft copolymer of an alkyl acrylate graft copolymerized on a substrate copolymer of maleic anhydride with an N-vinyl lactam are disclosed. These copolymers are useful as cast films, protective coatings, impregnants, and sizing agents. They are redispersible in water.

---

The present invention relates to stable aqueous emulsions and more particularly to stable aqueous emulsions comprising a grafted terpolymer containing an N-vinyl lactam, maleic acid and an alkyl acrylate.

Grafted polymer systems comprising a basic homopolymer chain containing grafted thereon units or a plurality of units of one or more polymerizable monomers in chain form represent an interesting and important development in the resin arts, particularly since such grafted polymers find immediate and practical utility for the resin chemist to utilize them as "building block" resin systems, or "module" resin systems which can be employed to "tailor make" subsequent resin systems to suit specific industrial needs. These grafted copolymers can be made by a variety of polymerization methods including solution, emulsion, or bulk polymerization and the like. In the case of polymeric N-vinyl lactams and particularly polyvinyl pyrrolidone, their use has been limited to a great extent to those fields of utility which take advantage of the inherent physical characteristics of polyvinyl pyrrolidone, the most important of which is water solubility. While this physical characteristic of water solubility has projected polymeric N-vinyl lactams into a position of prominence for such industrial application as pharmaceuticals, cosmetics, textiles and other uses, it has conversely precluded their use in industrial applications where water insolubility of the resins has been required.

Accordingly, it is an object of this invention to provide stable aqueous emulsions of grafted terpolymers containing N-vinyl lactams, maleic acid and alkyl acrylate units.

It is a further object of the present invention to provide stable aqueous emulsions of grafted terpolymers comprising an N-vinyl lactam, maleic acid and alkyl acrylate wherein the water insolubility of the resins is utilized in forming novel latex products.

Still another object of this invention resides in the provision of a novel process for preparing the improved terpolymer compositions of this invention.

Still other objects of the invention will become apparent as the description thereof proceeds.

Briefly stated, in accordance with the above-defined objects, methods have been devised whereby stable aqueous emulsions or latices are provided comprising terpolymers of N-vinyl lactams, maleic acid and alkyl acrylates.

As a result of the invention upon which the present discovery is based, the latices of the present invention find immediate practical applicability for use as cast films which are transparent, colorless and flexible. The films which are deposited employing the terpolymers of this invention are strong and clear and can be produced directly upon evaporation at room temperatures. Such materials are eminently useful as protective coatings, impregnants, permanent sizing agents for paper, leather and the like. A particularly advantageous feature resides in the fact that once a film is cast employing the emulsion latices of the present invention they remain water sensitive and can be sufficiently dispersed or reemulsified in water to permit their removal if desired. Still other useful applications of the emulsions of the invention will become apparent as description thereof proceeds.

The N-vinyl lactams utilized in the preparation of the compositions of this invention may be characterized by the following general structural formula:

(I) 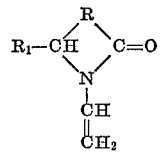

wherein R represents an alkylene bridge group necessary to complete a five, six or seven membered heterocyclic ring system and $R_1$ represents hydrogen, alkyl, aryl, alkaryl or aralkyl.

All the specific materials characterized by the foregoing general formula are commercially available and are called N-vinyl lactams. Specific compounds falling within this general class include N-vinyl-2-pyrrolidone, N-vinyl-5-methyl-2-pyrrolidone, N-vinyl-2-piperidone, N-vinyl-e-caprolactam, and the like. A preferred material for use in this invention is N-vinyl-2-pyrrolidone.

In the present invention a copolymer of the aforedescribed N-vinyl lactams is formed by reaction with maleic anhydride and this copolymer is then reacted with an alkyl acrylate to form the novel terpolymers. While not wishing to be bound by any particular theory or mechanism of reactions, it is believed that the arrangements of the polymer and the monomeric units, that is, the maleic anhydride and the alkyl acrylate units, is as follows: units of the N-vinyl lactam and the maleic anhydride are believed to form the main chain of the polymer which polymerization occurs when the starting copolymer is formed. Thereafter, this copolymer is reacted with the alkyl acrylate in an aqueous medium to form the terpolymer of this invention. It is believed that during the latter reaction, a side chain consisting of the alkyl acrylate units is grafted onto this copolymer while the aqueous medium simultaneously hydrolyzes the maleic anhydride units to the acid. In other words the N-vinyl lactam and maleic acid are believed to form a rather more or less alternating main polymer chain with the alkyl acrylate radical grafted thereon.

It is believed that this novel arrangement of the monomer units in conjunction with the polymer, represents an important aspect of the present invention and provides the novel and unexpected properties thereof. That is, the arrangement is a primary feature in providing the excellent stability which is shown by the latex of the present invention.

The alkyl acrylate materials which are used in forming the novel terpolymers of this invention may be described by the following structural formula:

(II) 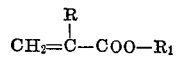

wherein R represents hydrogen or an alkyl radical and $R_1$ represents a straight or branch-chained alkyl radical. A particularly valuable class of these alkyl acrylates are those wherein R is hydrogen and $R_1$ has from one to seven carbon atoms. An especially preferred material falling within the above-defined groups is ethyl acrylate and this material is employed in the following representative specific embodiments of the invention.

The maleic acid component of the terpolymer of this invention is necessarily supplied by way of the corresponding anhydride inasmuch as maleic acid per se does not polymerize readily. It is to be appreciated, according to the methods hereinafter described, that a copolymer of the maleic anhydride and the N-vinyl lactam is initially prepared and this material subsequently reacted with the alkyl acrylate in an aqueous system which serves the dual function of forming the terpolymer product and as well as serving to hydrolyze the anhydride groups in the chain to carboxylic acid groups.

The novel graft terpolymer of this invention can be readily and conveniently prepared by initially forming a copolymer of an N-vinyl lactam, such as N-vinyl pyrrolidone and maleic anhydride, which copolymerization reaction is necessarily carried out under anhydrous conditions to prevent hydrolysis of the anhydride to the acid.

Such lactam/anhydride copolymers may contain from 99% lactam to 1% maleic anhydride to 50% lactam and 50% maleic anhydride. Especially preferred copolymers for use in forming the terpolymers of this invention, comprise no more than about 30% of maleic anhydride.

In carrying out the process of this invention the N-vinyl lactam/maleic anhydride copolymer is initially prepared by known methods and then dispersed in an aqueous reaction medium, with the use of a dispersing agent. A suitable dispersing agent may include for example, a mixture of mono and diphosphate esters of the nonionic surfactant from nonyl phenol with about 10 moles of ethylene oxide. After charging the above reactants to a suitable reaction flask the required amount of an alkyl acrylate, such as ethyl acrylate, is slowly added to the dispersed copolymer. During this gradual addition the monomeric alkyl acrylate unit is graft polymerized onto the copolymer previously formed from the N-vinyl pyrrolidone and the maleic anhydride.

When the N-vinyl lactam/maleic anhydride copolymer is dispersed into the aqueous medium, essentially all of the anhydride groups in the polymer chain are hydrolyzed to free carboxylic acid groups. It has been found that these carboxylic acid-containing copolymers are active enough for the graft polymerization so that a further catalyst need not be employed.

The final composition of the graft terpolymer formed in the reaction can be varied over a wide range by any of several procedures. For example, the initial N-vinyl lactam/maleic anhydride copolymer may be formed in different ratios as noted hereinabove which of course will form a predominance of the one employed in excess in the main chain of the terpolymer. Also, the final composition of the terpolymer can be controlled by varying the ratio of substrate copolymer and the alkyl acrylate which is grafted thereon during the gradual addition. In general, the final terpolymer may be characterized as containing from 99% of the copolymer and 1% of the acrylate to as little as 10% of the copolymer and 90% of the acrylate.

It is further to be appreciated that by varying the ratio of N-vinyl lactam to maleic anhydride used in forming the starting copolymer on which the alkyl acrylate is grafted, the carboxylic content of the final product can be substantially varied. For example, for many applications only a relatively low carboxylic content is desired, while in other applications, such as for films to be applied to materials containing hydroxyl groups, such as cellulose, better adhesion is obtained if relatively large amounts of maleic anhydride are present in the final polymer so that the final terpolymer has a high carboxylic content. The carboxylic groups also offer reactive sites in the final terpolymer so that it can be further modified by esterification, amidation, etc. of some or all of the carboxylic groups in the terpolymer. By varying the proportions of the alkyl acrylate, the properties of the final terpolymer can be further modified to provide products having a varied field of properties and applications.

The temperature at which the polymerization reaction may be advantageously carried out can be varied over a wide range from about 60° C. to about 120° C. during the gradual addition of the alkyl acrylate. However, it is preferred to conduct the graft polymerization reaction at a temperature of about 85° C. to about 100° C. in order to avoid an undesirably violent reaction and yet achieve significant production of the desired product. Graft polymerization temperatures of about 90° C. provide products having desirable viscosity and molecular weight.

The graft polymerization reaction of this invention is normally carried out in a reaction vessel under a blanket of inert gas such as nitrogen, argon or the like. Also the reaction may be carried out under the pressure of the monomers if desired although it is preferred that the reaction be carried out at about atmospheric pressure.

If desired, activating agents such as alkali metal sulfites or bi-sulfites can be added to the polymerization reaction mixture in which case, lower polymerization temperatures may be used. Also chain regulators such as hexyl, cetyl, dodecyl, etc., mercaptans can be employed in the polymerization reactions. Moreover, suitable surface active agents including fatty acid soaps, fatty alcohol sulfates, sulfonate acids, etc., may be employed in the process.

During the reaction it is contemplated that the polymeric product can be modified by different chemical means including esterification, amidation, cross linking, etc., where it is desired to modify the reactive groups contained on the polymer.

The terpolymer emulsions resulting from the process of the invention can be compounded with additives such as pigments, salts, wetting agents, resins, waxes and the like, thus providing a wide spectrum of products having wide industrial application.

It has also been found that stable emulsions of the class described above can be prepared without the use of emulsifying agents or protective colloids although it has been observed that it is preferable to add such materials to the emulsion recipe in order to obtain high conversions and greater stability of the results of the emulsions.

The following example will serve to illustrate the invention.

EXAMPLE I

The apparatus employed in this example comprised a 1-liter resin kettle equipped with a mechanical stirrer, reflux condenser, dropping funnel, gas inlet tube, sampling tube, and a thermometer.

The reaction was carried out by charging 213.8 ml. of water and a solution of 7.5 grams of surfactant (mixture of mono- and diphosphate esters of nonionic surfactant from nonyl phenol with 10 moles ethylene oxide) in 75 ml. of water to the reaction flask. Thereafter, 54 grams of a copolymer formed by polymerizing nine parts of N-vinyl pyrrolidone to one part maleic anhydride was added to the solution with agitation. The stirred solution was then heated to about 90° C. and 126 grams (138.0 ml.) of ethyl acrylate was added gradually dropwise over a two-hour period while stirring at 92° C. After the addition was complete, the stirring was continued at 92° C. for an additional ten hours.

At the conclusion of the reaction, the mixture was cooled to room temperature and the terpolymer product recovered. From the product mixture, the following analytical results were obtained:

Analytical results

| | |
|---|---|
| Total solids, percent | 39.7 |
| Residual monomer, percent | 0.2 |
| Conversion, percent | 100.0 |
| Brookfield viscosity (cps.) | 278.0 |

The graft terpolymer recovered from Example I was dissolved in dimethylformamide solvent and cast upon a support. After drying to remove the solvent, there remained a film which was colorless, flexible and water resistant.

In a similar manner, other N-vinyl lactams of the class described hereinabove can be employed in place of the N-vinyl pyrrolidone of Example I with similar results. Also alkyl acrylates other than ethyl acrylate may be employed if desired.

Reference in the specification and claims to parts, proportions and percentages, unless otherwise specified, refer to parts, proportions and percentages by weight.

It is obvious that numerous changes and modifications can be made in the above-described disclosure of the invention without departing from the spirit and nature thereof. It is to be understood, however, that all such changes and modifications are included within the scope of the invention and the invention is not to be limited to the exemplary details set forth by way of example, but is to be limited only by the appended claims.

What is claimed is:

1. A stable aqueous emulsion comprising an alkyl acrylate graft polymerized on a substrate copolymer of maleic anhydride with an N-vinyl lactam of the formula:

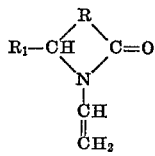

wherein R represents an alkylene bridge group containing two to four carbon atoms and $R_1$ represents a member selected from the group consisting of hydrogen, alkyl, aryl, alkaryl and aralkyl.

2. The emulsion as defined in claim 1 wherein said copolymer contains about 1 to 50% maleic anhydride and 99 to 50% N-vinyl lactam.

3. The emulsion as defined in claim 2 wherein said copolymer contains about 1 to 30% maleic anhydride.

4. The emulsion as defined in claim 1 wherein said alkyl acrylate is ethyl acrylate.

5. The emulsion of claim 1 wherein the N-vinyl lactam is N-vinyl pyrrolidone and the alkyl acrylate is ethyl acrylate.

6. The emulsion of claim 1 wherein the N-vinyl lactam is N-vinyl pyrrolidone.

7. The emulsion of claim 6 wherein the alkyl acrylate is ethyl acrylate.

8. A process for the production of a stable aqueous emulsion as defined in claim 1 which comprises dispersing a copolymer of said N-vinyl lactam and maleic anhydride into an aqueous solution as a dispersion, adding said alkyl acrylate to the dispersion and subjecting the resulting mixture to emulsion polymerization conditions.

9. A process according to claim 8 wherein the N-vinyl lactam is N-vinyl pyrrolidone.

10. A process according to claim 8 wherein the alkyl acrylate is ethyl acrylate.

References Cited

UNITED STATES PATENTS

| 3,029,220 | 4/1962 | Murdock et al. | 260—29.6 X |
| 3,061,569 | 10/1962 | Stoner et al. | 260—29.6 |
| 3,468,832 | 9/1969 | Barabas et al. | 260—29.6 |
| 3,468,385 | 8/1969 | Barabas et al. | 260—29.6 |

OTHER REFERENCES

Chemical Abstracts, 60, 14706g–14707h (1964).

WILLIAM H. SHORT, Primary Examiner
E. A. NIELSEN, Assistant Examiner

U.S. Cl. X.R.
260—885